United States Patent [19]

Ghaem et al.

[11] Patent Number: 5,457,447
[45] Date of Patent: Oct. 10, 1995

[54] PORTABLE POWER SOURCE AND RF TAG UTILIZING SAME

[75] Inventors: Sanjar Ghaem, Palatine; George L. Lauro, Lake Zurich; Rudyard L. Istvan, Winnetka, all of Ill.

[73] Assignee: Motorola, Inc., Schaumburg, Ill.

[21] Appl. No.: 40,969

[22] Filed: Mar. 31, 1993

[51] Int. Cl.[6] .................................................. H04Q 1/00
[52] U.S. Cl. ..................... 340/825.54; 323/906; 322/2 R; 320/20
[58] Field of Search ........................ 340/825.54, 825.34; 323/906; 322/2 R; 320/20

[56] References Cited

U.S. PATENT DOCUMENTS

| | | | |
|---|---|---|---|
| 4,827,395 | 5/1989 | Anders | 340/825.54 |
| 4,955,038 | 9/1990 | Lee | 340/825.54 |
| 5,300,875 | 4/1994 | Tuttle | 320/20 |

*Primary Examiner*—Donald J. Yusko
*Assistant Examiner*—Brian Zimmerman
*Attorney, Agent, or Firm*—Phillip H. Melamed

[57] ABSTRACT

An RF tag (10) includes an RF receiver (16) and an RF transmitter (18). A power source (12) provides power to the receiver and transmitter. The power source includes a plurality of energy converters (22, 24, 26, 28, 30, and 32). Each energy converter is responsive to a predetermined form of incident energy for converting its respective predetermined form of incident energy to electrical current. At least two of the energy converters are responsive to respective different predetermined forms of incident energy for providing electrical current. A storage capacitor (54) stores the electrical current provided by the energy converters and is coupled to the RF receiver and RF transmitter. A plurality of RF tags (10, 110, 140, 160) utilizing the power source 12 are also described.

40 Claims, 7 Drawing Sheets

PORTABLE POWER SOURCE AND RF TAG UTILIZING SAME

FIELD OF THE INVENTION

The present invention generally relates to the field of portable power sources and more particularly to a portable power source which is responsive to incident energy for converting the incident energy to electrical current. The present invention is more particularly directed to such a power source which includes a plurality of energy converters wherein each energy converter is responsive to a predetermined form of incident energy for providing electrical current with at least two of the energy converters being response to respective different predetermined forms of incident energy for providing electrical current. The present invention is further directed to an RF tag which includes an RF transmitter for transmitting an identification signal and which is powered by the portable power source.

BACKGROUND OF THE INVENTION

There are many portable electronic device applications wherein a portable electronic device requires low power to support its operation. Calculators and automobile door lock and security system actuating transmitters are just a couple of examples of such portable device applications. In the past, battery power has been utilized to support the operation of such devices. More recently, portable calculators, instead of being powered by a battery, have been powered photovoltaic cells which generate power for the calculators responsive to incident visible light.

One problem associated with battery power is that batteries are depletable power sources. Hence, when a battery becomes depleted, it must either be replaced or recharged. Such replacement or recharging is not always convenient.

Photovoltaic cells, as is well known, require incident light for providing electrical energy. Hence, such devices cannot be relied upon at all times to provide electrical power, as for example, when such devices are in the dark.

From the foregoing, it can be seen that portable power sources of the prior art exhibit numerous disadvantages. Depletable power sources, such as batteries, eventually require replacement or recharging. Photovoltaic cells do not provide electrical current under all circumstances.

Other forms of portable power sources are also known. For example, in the RF tag field, at least one RF tag is known which utilizes an active device in the form of an RF transmitter which transmits an RF signal and is powered by a tuned circuit which converts RF energy at a predetermined frequency to sufficient electrical energy to power the transmitter for a very short period of time, on the order a few milliseconds. In this application, the tuned circuit on the RF tag charges a capacitor when it receives an RF signal at the predetermined frequency. When the capacitor is charged to an appropriate level, the transmitter is energized and transmits its RF signal for just a few milliseconds until the charge on the capacitor is depleted.

While such an arrangement is sufficient for its intended purpose, for use in an RF tag system employed, for example, for access control or automatic toll debiting, it is not suitable for general application to portable electronic devices. The arrangement provides power for only a short period of time and the tuned circuit generates power responsive to receipt of RF energy transmitted at a specific frequency. As a result, the amount of power generated is extremely low, severely limiting the range of the transmitted signal. Further, such an arrangement requires two separate antennas. One antenna must be relatively large for generating sufficient electric current to charge the capacitor. The second antenna is utilized as the transmitting antenna. With the need for two separate antennas, and especially with one antenna being rather large in dimension, RF tags of this type have in turn been relatively large in dimension.

Hence, there is a need in the art for an improved power source for portable electronic device applications. Such an improved power source preferably continuously generates electrical current under a variety of conditions for the storage of electrical energy for use at any time by the portable electronic device with which it is associated. The power source preferably generates electrical current for storage responsive to a plurality of different forms of incident energy such as electromagnetic energy (RF energy, visible light, etc.) and vibrational energy such as acoustic energy. There is also a need in the art for an improved RF tag which includes a portable receiver and transmitter which are powered by such an improved power source.

SUMMARY OF THE INVENTION

The present invention therefore provides a power source for generating and storing electrical current for providing the electrical energy to a portable electronic device. The power source includes a plurality of energy converters, with each energy converter being responsive to a predetermined form of incident energy for converting its respective predetermined form of incident energy to electrical current and wherein at least two of the energy converters are responsive to respective different predetermined forms of incident energy for providing electrical current. The power source further includes storage means for storing the electrical current provided by the energy converters.

The present invention further provides an RF tag including an RF transmitter for transmitting an identification signal. The RF tag further includes a power source for powering the RF transmitter. The power source includes a plurality of energy converters with each energy converter being responsive to a predetermined form of incident energy for converting its respective predetermined form of incident energy to electrical current. At least two of the energy converters are responsive to respective different predetermined forms of incident energy for providing electrical current. The power source further includes storage means for storing the electrical current provided by the energy converters and is coupled to the RF transmitter.

In accordance with a further aspect of the present invention, the RF tag includes antenna means for receiving an interrogation signal and is coupled to the storage means. The power source provides electrical current to the storage means for charging the storage means to a voltage below a threshold voltage. The RF transmitter is responsive to the interrogation signal received by the antenna means forcing the voltage on the storage means above the threshold voltage for transmitting the interrogation signal. In accordance with this further aspect of the present invention, the storage means may include a first storage means for storing a first voltage derived from the power source and a second storage means for storing a second voltage derived from the interrogation signal wherein the first voltage is below the threshold voltage and wherein the sum of the first and second voltages is above the threshold voltage.

In accordance with a still further aspect of the present invention, the power source includes an energy converter responsive to incident vibrational energy and at least one additional energy converter for providing electrical current to the storage means when the power source is at rest for charging the storage means to a voltage below a threshold voltage. The energy converter responsive to incident vibrational energy is responsive to receiving vibrational energy for charging the storage means to a voltage above the threshold voltage. The transmitting means is responsive to the storage means charging to a voltage above the threshold voltage for transmitting the identification signal.

In accordance with a still further aspect of the present invention, the RF tag includes an RF receiver for receiving an interrogation signal and voltage sensing means coupled to the storage means and responsive to the voltage on the storage means exceeding a first threshold voltage for energizing the receiver. In accordance with this further aspect, the voltage sensing means further de-energizes the RF receiver when the voltage on the storage means decreases to or below a second voltage threshold in the absence of a received interrogation signal. Further, the RF transmitter may be responsive to the voltage sensing means sensing a voltage on the storage means above the second threshold voltage and to the RF receiver receiving the interrogation signal for transmitting the identification signal. The RF transmitter may further be responsive to the voltage sensing means for transmitting the identification signal until the voltage sensing means senses a decreased voltage on the storage means below a third threshold voltage. The RF tag may include a single antenna for transmitting the identification signal and for receiving the interrogation signal and include switch means for selectively coupling the antenna to the RF transmitter and the RF receiver responsive to the voltage sensing means.

In accordance with a still further aspect of the present invention, the power source may include an energy converter responsive to incident vibrational energy and wherein the RF transmitter is responsive to the voltage sensing means sensing a voltage on the storage means above the second threshold voltage and sensing the energy converter responsive to incident vibrational energy receiving incident vibrational energy and to the RF receiver receiving the interrogation signal for transmitting the identification signal.

The present invention still further provides an RF tag including an RF transmitter for transmitting an identification signal and a power source for powering the RF transmitter. The power source includes an energy converter responsive to incident vibrational energy for providing power to the RF transmitter and causing the RF transmitter to transmit the identification signal.

DETAILED DESCRIPTION OF THE PREFERRED EMBODIMENT

Figure 1:
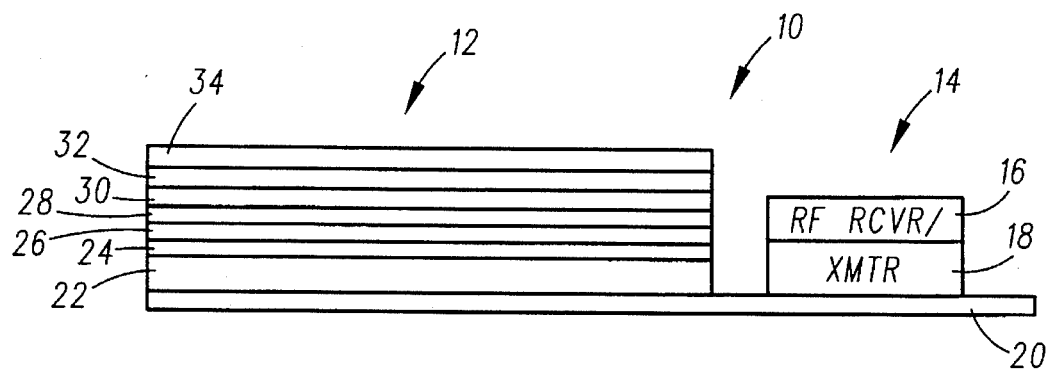
FIG. 1 is a side plan view of an RF tag embodying the present invention which includes a power source embodying the present invention and an RF receiver/transmitter.

Referring now to FIG. 1, it illustrates, in side plan view, an RF tag 10 embodying the present invention. The RF tag 10 generally includes a portable power source 12 also embodying aspects of the present invention and an electronic device 14 in the form of an RF receiver 16 and an RF transmitter 18. The power source 12 and electronic device 14 are carried by a substantially planar protective layer or substrate 20 which is preferably of insulative material such as ceramic material or a plastic material. The electronic device 14 is coupled to the power source 12 in a manner to be described hereinafter so that the electronic device 14 may be powered by the power source 12.

The power source 12 includes a plurality of energy converters 22, 24, 26, 28, 30, and 32. Each of the energy converters is substantially planar in configuration and is responsive to a predetermined form of incident energy for converting its respective predetermined form of incident energy to electrical current. The energy converters 22, 24, 26, 28, 30, and 32 are arranged one on top of the other as illustrated between the substrate 20 and another protective layer 34 which may be formed from a transparent insulative plastic material.

In accordance with this preferred embodiment, energy converter 22 is preferably responsive to infrared incident energy for providing electric current, energy converter 24 is preferably responsive to low frequency RF energy for providing electrical current, energy converter 26 is preferably responsive to incident vibrational energy for providing electrical current, and energy converter 28 is preferably responsive to incident heat energy for providing electric current. Further, energy converter 30 is preferably responsive to high frequency RF energy for providing electrical current, and energy converter 32 is preferably responsive to incident visible light for providing electrical current. The energy converters 22, 24, 26, 28, 30 and 32 may be interconnected as will be described subsequently with respect to FIG. 6 for charging a storage capacitor with the electrical current provided by the energy converters.

In accordance with this preferred embodiment, at least two of the energy converters are responsive to respective different predetermined forms of incident energy for providing electrical current so that the storage capacitor of the power source 12 is continuously being charged under various circumstances. As will be noted from the above, energy converter 32 provides electrical current responsive to incident visible light whereas energy converter 26 provides electrical current responsive to incident vibrational energy such as acoustic energy or other physical vibration energy converter 28 provides electrical current responsive to incident heat energy, energy converter 22 provides electrical current responsive to incident infrared energy, and energy converters 24 and 30 provide electrical current responsive to incident low frequency and high frequency radio frequency energy respectively. As a result, the capacitor of the power source 12 is charged under a variety of circumstances whether the RF tag 10 is in visible light, in the dark, is being vibrated, or is receiving infrared energy. Hence, regardless of the application of the electronic device 14 and the circumstances under which it is in use, electrical power will always be available to it to support its operation.

Figures 2, 3:
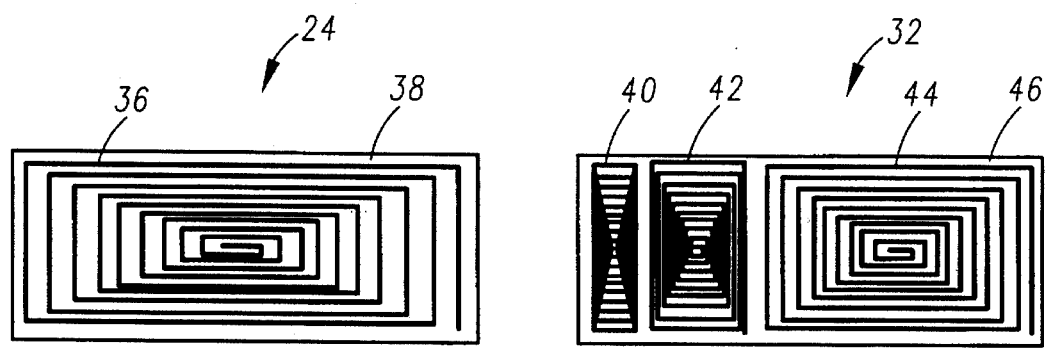
FIG. 2 is a top plan view of a low frequency RF energy converter which may be utilized in practicing the present invention.
FIG. 3 is a top plan view of a high frequency RF energy converter which may be utilized in practicing the present invention.

Referring now to FIG. 2, it illustrates in top plan view, the low frequency RF energy converter 24. The energy converter 24 is formed by spiralling antenna loops 36 formed by continuous loops of decreasing dimension from an outer loop to a most inner loop. The antenna loops 36 are formed in a single plane on an insulating layer 38 which, in accordance with this preferred embodiment, overlies the infrared energy converter 22. The antenna loops 36 may be formed of copper, for example, or if energy converter 24 is placed over an energy converter which converts visible light to electrical current, the antenna loops 36 may be formed from indium tin oxide (ITO) which is a transparent conductor well known in the art. Alternatively, the antenna loops 36 may be formed from continuous wire wound in a single plane. Because the antenna loops are of varying dimension, the energy converter 24 will convert incident RF energy having frequencies over a wide spectrum of frequencies to electrical current. For example, the RF energy converter 24 of FIG. 2 may be utilized for converting radio frequency energy in the frequency spectrum below 1 gigahertz to electrical current.

Referring now to FIG. 3, it illustrates in top plan view, the configuration of the high frequency RF energy converter 30. The energy converter 30 is formed from three different spiral loop antennas 40, 42, and 44 which are formed on an insulating layer 46 which, as described with respect to energy converter 24 of FIG. 2, may be an insulative layer overlying energy converter 28. The spiral loop antennas 40, 42, and 44 may be formed of copper, for example, ITO, or continuous wires as previously described. Since the spiral loop antennas 40, 42, and 44 vary in dimension, the energy converter 30 converts radio frequency energy over a wide frequency spectrum to electrical current. Energy converter 30 may be utilized, for example, for generating electrical current responsive to incident radio frequency energy in the frequency spectrum above 1 gigahertz.

Figures 4, 5:
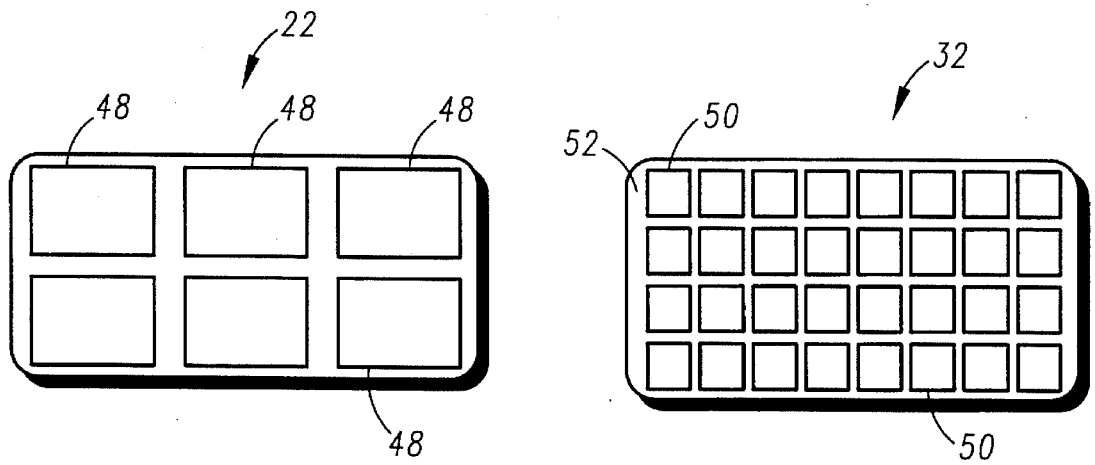
FIG. 4 is a top plan view of an energy converter which converts infrared energy to electrical current and which may be utilized in practicing the present invention.
FIG. 5 is a top plan view of an energy converter which converts incident visible light to electrical current and which may be utilized in practicing the present invention.

Referring now to FIG. 4, it is a top plan view of the infrared energy converter 22. The energy converter 22 is formed on the substrate 20 and includes a plurality of energy converting cells 48. Each cell 48 is responsive to incident infrared energy for providing electrical current and may be interconnected as an application dictates for providing different voltages and currents. For example, if all of the cells 48 are connected in series, the converter 22 will provide a higher voltage at a lower current than if all of the cells 48 are connected in parallel as can be appreciated by those skilled in the art. Infrared energy converters are well known in the art. One such form of infrared energy converter, for example, is a crystalline silicon solar cell of the type well known in the art. A plurality of such solar cells may be coupled together in any series or parallel combination depending upon individual voltage and current requirements.

Referring now to FIG. 5, it illustrates in top plan view the configuration of the energy converter 32 which is responsive to incident visible light for providing electrical current. The energy converter 32 preferably takes the form of a photovoltaic device which includes a plurality of photovoltaic cells 50. The photovoltaic cells 50 may be coupled together in various series and parallel combinations depending upon individual voltage and current requirements. The cells 50 are formed on an insulative layer 52 which overlies the high frequency RF energy converter 30. The cells 50 may take the form of photovoltaic cells formed from amorphous semiconductor alloy materials as disclosed, for example, in U.S. Pat. No. 4,379,943. Photovoltaic cells formed of amorphous semiconductor alloy materials may be preferred in applications where the portable power source 12 will be subjected to considerable incident vibrational energy because amorphous semiconductor alloy photovoltaic cells are generally not as fragile as crystalline photovoltaic cells. As will be noted from FIG. 1, the energy converter 32 is formed as the top most layer of energy converters so that intervening layers will not block the incident visible light to the photovoltaic cells 50.

The energy converter 28 which converts incident heat energy to electrical current may take the form of a thermocouple. Such thermocouples are well known in the art.

Figure 6:
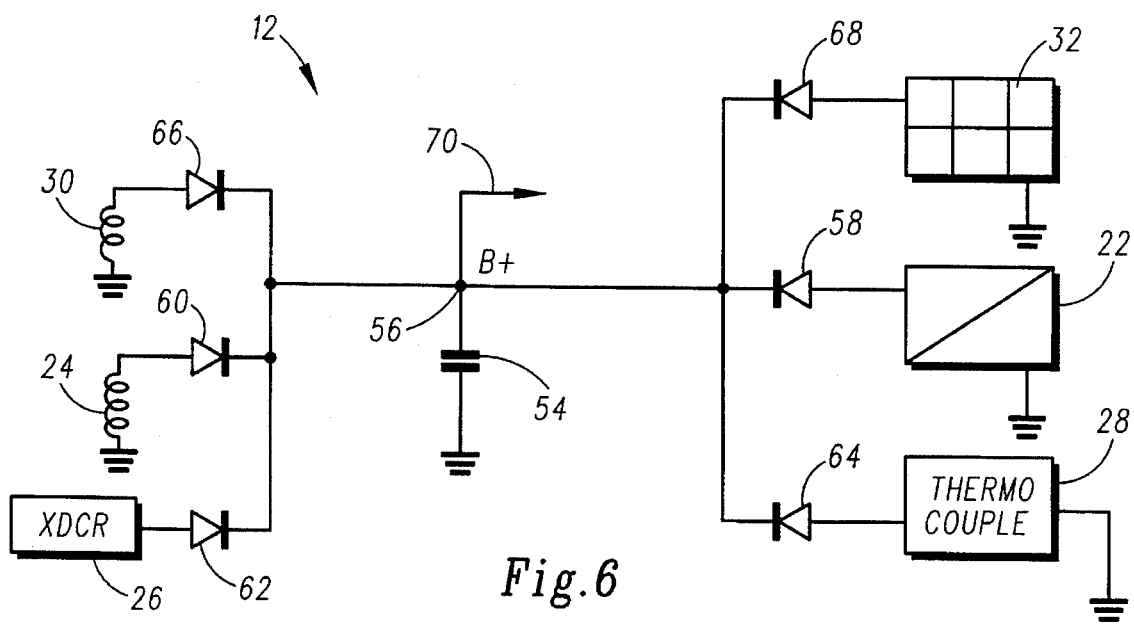
FIG. 6 is a schematic circuit diagram illustrating the manner in which the energy converters of a power source embodying the present invention may be interconnected.

Referring now to FIG. 6, it illustrates the manner in which the energy converters of power source 12 may be interconnected for charging a storage capacitor 54. In FIG. 6 it will be noted that each of the energy converters 22, 24, 26, 28, 30, and 32 is coupled to a B+ terminal 56 by a diode 58, 60, 62, 64, 66, and 68 respectively. Each diode serves to isolate its associated energy converter from the other energy converters. Also, when an energy converter provides an alternating electrical current, such as energy converters 24, 26, 28, and 30, their associated diodes further serve to rectify the alternating current to pulsating direct current for application to the terminal 56. The capacitor 54 is coupled between the B+ terminal 56 and ground so as to receive the electrical current provided by the energy converters and to store the electrical current as electrical energy for connection to the portable electronic device over a line 70.

Figure 7:
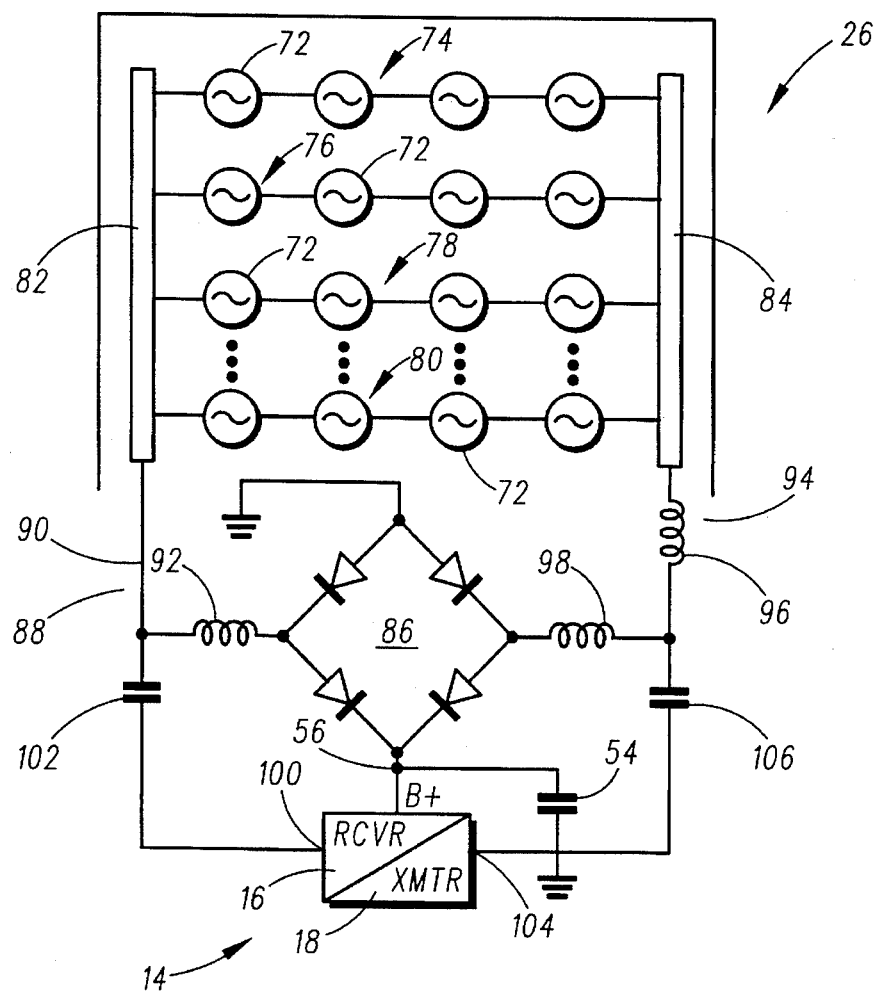
FIG. 7 is a schematic circuit diagram illustrating an energy converter which may be utilized in practicing the present invention which converts incident vibrational energy to electrical current and a circuit for interconnecting the energy converter to an RF receiver/transmitter in accordance with the present invention.

Referring now to FIG. 7, it illustrates a preferred form of energy converter which converts incident vibrational energy to electrical current as, for example, energy converter 26. FIG. 7 further illustrates a preferred manner of interconnecting the energy converters together and to the electronic device 14 which includes the aforementioned RF receiver 16 and RF transmitter 18.

As will be noted in FIG. 7, the energy converter 26 comprises a plurality of transducer cells. Each transducer cell 72 is of the type which converts incident vibrational energy to an alternating current. The transducer cell 72 may be formed of piezo electric material which is flexible so that flexing causes the alternating electrical current to be generated by each of the transducer cells 72.

Alternatively, the cells 72 may be responsive to acoustic energy which causes vibration and in turn causes electrical current to be produced. The cells 72 may be formed, for example, from piezo material commonly used in microphones to convert acoustic energy to electrical current.

The transducer cells 72 are arranged in rows 74, 76, 78, and 80 with the cells of each row connected in series. The rows of cells are in turn connected in parallel by first and second interconnect buses 82 and 84.

Each of the energy converters 22, 24, 26, 28, 30, and 32 may include such first and second interconnect buses. For those energy converters which generate direct current electrical current, one such bus may be coupled to ground and the other such bus may be coupled to the terminal 56 through a diode as illustrated in FIG. 6. For those energy converters which generate alternating current, a diode bridge 86 may preferably be employed for rectifying the alternating current and applying pulsating direct current to the terminal 56 as illustrated in FIG. 7. The first bus 82 is coupled to the diode bridge by a first coupling means 88 which includes a conductor 90 and an RF choke 92. The second bus 84 is coupled to the diode bridge 86 by a second coupling means 94 which includes a tuning inductor 96, to be described more completely hereinafter and an RF choke 98.

The receiver 16 includes an input 100 which is capacitively coupled to conductor 90 by a capacitor 102. The transmitter 18 includes an output 104 which is capacitively coupled to the junction of inductor 96 and RF choke 98 by another capacitor 106.

In accordance with the preferred embodiment of the present invention, the receiver 16 receives an interrogation signal from an external transmitter. In response to the receiver 16 receiving the interrogation signal, the transmitter 18 transmits an identification signal having a predetermined identification code corresponding to a specific code associated with the RF tag 10. Preferably, the transmitter 18 transmits on a frequency which is different than the frequency upon which receiver 16 receives. The interconnect means of the energy converters, and more specifically as illustrated in FIG. 7, the first bus 82, the second bus 84, and the conductors interconnecting the cells 72 form an antenna for both the receiver 16 and the transmitter 18. The RF choke 92 isolates the diode bridge 86 from the received interrogation signal and the capacitor 102 isolates the input 100 of receiver 16 from the electrical current generated by the cells 72. Similarly, RF choke 98 isolates the diode bridge 86 from the RF signal transmitted by transmitter 18 and capacitor 106 isolates the output 104 of transmitter 18 from the electrical current generated by the cells 72. The inductor 96 tunes the antenna provided by the energy converters and interconnects to a frequency which is different from the receiving frequency of receiver 16.

The electronic device 14 including receiver 16 and transmitter 18 is thus provided with power from the power source including energy converter 26. The electrical current generated by the power source including energy converter 26 is stored in the capacitor 54 and is made available to the electronic device 14 at the B+ terminal 56.

When the receiver 16 receives an interrogation signal transmitted from an external transmitter, the transmitter 18 in response to the receiver 16 receiving the interrogation signal transmits from its output 104 and over the antenna formed by the power source an identification signal which may be a predetermined identifying code which may identify the type of article to which the RF tag 10 is attached or the destination of the article to which the RF tag 10 is attached, for example.

As will be appreciated by those skilled in the art, various modifications of the portable power source and RF tag thus far described are possible. For example, the electronic device 14 may be integrated in a substantially planar configuration and form one of the layers of the power source 12 so as to be encapsulated inside the power source 12. Further, any combination of the energy converters disclosed herein may be utilized for providing electrical current to a portable electronic device. In some applications, an energy converter responsive to incident vibrational energy for providing electrical current and an energy converter responsive to incident radio frequency energy for providing electrical current may only be required in forming the power source 12. Such applications include systems that are to be operated at night, in the dark, or inside packaging or containments. Similarly, only an energy converter responsive to incident radio frequency energy for providing electrical current and an energy converter responsive to incident visible light for providing electrical current may only be necessary in some applications.

Figure 8:
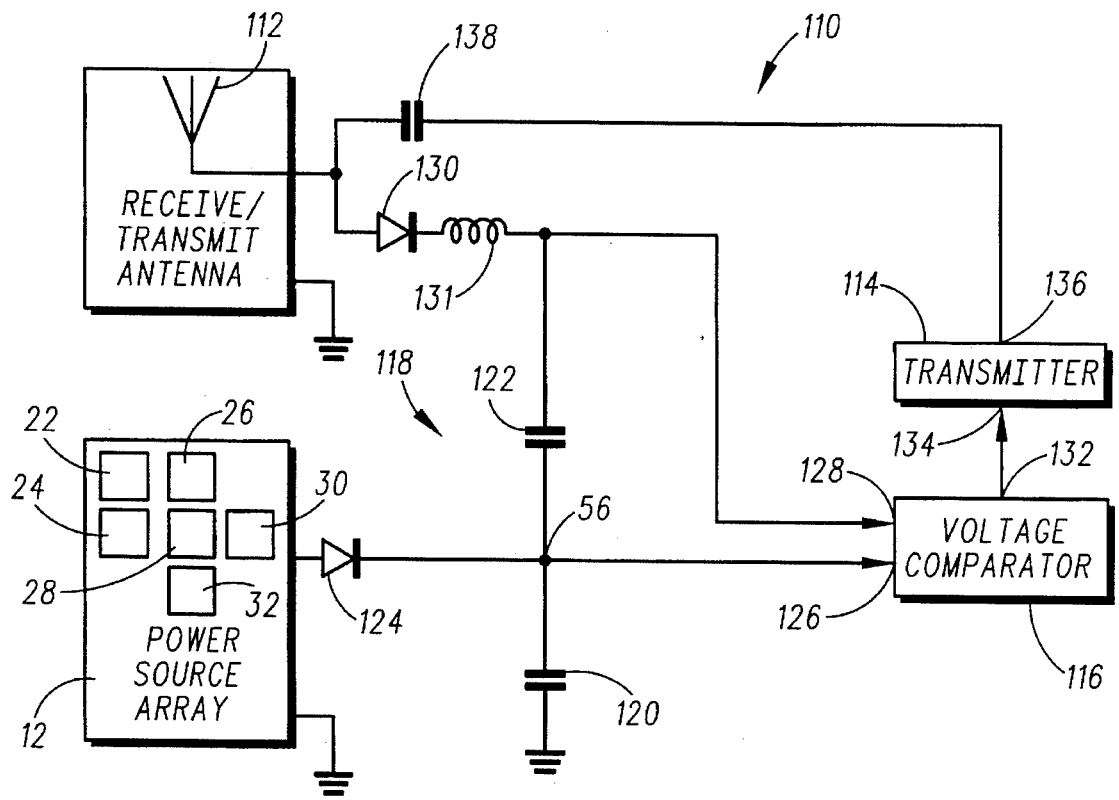
FIG. 8 is a schematic block diagram of an RF tag embodying the present invention employing the power source of FIGS. 1 and 6.

Referring now to FIG. 8, it is a schematic block diagram of another RF tag 110 embodying the present invention. The RF tag 110 generally includes the power source 12 previously described with reference to FIGS. 1 and 6, a single receiving and transmitting antenna 112, an RF transmitter 114, a voltage comparator 116, and a storage means 118.

The storage means 118 includes a first storage capacitor 120 and a second storage capacitor 122. The power source 12 is coupled to the common junction 56 of capacitors 120 and 122 by a diode 124. The common junction 56 is in turn coupled to a first input 126 of voltage comparator 116.

The receiving and transmitting antenna 112 is coupled to the capacitor 122 and a second input 128 of voltage comparator 16 by another diode 130 and an RF choke 131. The output 132 is coupled to a control input 134 of the RF transmitter 114. Lastly, the output 136 of RF transmitter 114 is coupled to the receiving and transmitting antenna 112 by a capacitor 138.

In operation, the power source 12 is arranged, by selective parallel and series coupling of the energy converters 22, 24, 26, 28, 30, and 32 to charge capacitor 120 at junction 56 to a voltage just below a threshold voltage. When an interrogation signal is received by the receiving and transmitting antenna 112, the energy of the interrogation signal is conducted through diode 130 and charges capacitors 120 and 122 to a voltage above the threshold voltage. The voltage comparator 116 senses that sum of the voltages across the capacitor 120 and 122 of the storage means 118 is above the threshold voltage and responsive thereto provides an output from output 132 to the control input 134 of RF transmitter 114. In response to the output of voltage comparator 116, the RF transmitter 114 generates an identification signal at its output 136 which is then capacitively coupled to the receiving and transmitting antenna 112 for transmitting the identification signal to an external reader, for example.

As can thus be seen, the power source 12 provides the majority of the power required by transmitter 114. As a result, only a small amount of power is required by the reader in transmitting the interrogation signal to the RF tag 110. This results in decreased power transmitting requirements of the external reader for activating the RF transmitter 114 of the RF tag 110. As will be appreciated by those skilled in the art, if the transmitting power of the external reader is not decreased, the RF tag 110 provides an increased range for the effective use of the RF tag 110 in conjunction with the external reader. The RF tag 110 provides a further advantage in that since the majority of the power required by RF transmitter 114 is generated by the power source 112, the amount of received energy from the external reader in the form of the interrogation signal is reduced to permit the receiving and transmitting antenna 112 to be of smaller dimension than heretofore required in systems wherein the interrogation signal alone provided the necessary power for the RF transmitter.

Figure 9:
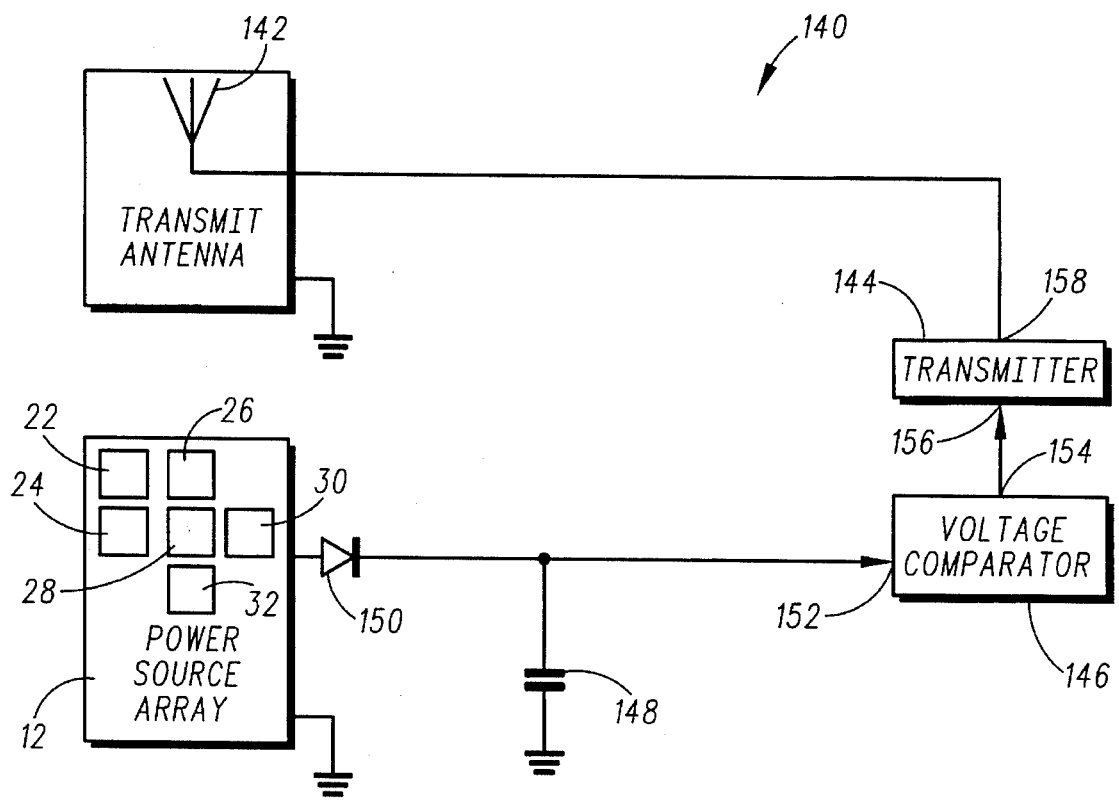
FIG. 9 is a schematic block diagram of another RF tag embodying the present invention employing the power source of FIGS. 1 and 6.

Referring now to FIG. 9, it is a schematic circuit diagram of a further RF tag 140 embodying the present invention. The RF tag 140 generally includes the power source 12, a transmitting antenna 142, an RF transmitter 144, a voltage comparator 146, and a storage capacitor 148. The power source 12 is once again preferably the power source 12 as described with reference to FIGS. 1 and 6 wherein at least one of the energy converters 22, 24, 26, 28, 30, and 32 is an energy converter which is responsive to incident vibrational energy for providing electrical current. In accordance with this preferred embodiment, the energy converter which is responsive to vibrational energy is energy converter 26.

The power source 12 is coupled to the storage capacitor 148 by a diode 150. The storage capacitor 148 is in turn coupled to an input 152 of voltage comparator 146. The output 154 of voltage comparator 146 is coupled to a control input 156 of RF transmitter 144. The output 158 of RF transmitter 144 is coupled to the transmitting antenna 142.

In operation, when the power source 12 is at rest and not receiving vibrational energy, the energy converters 22, 24, 28, 30, and 32 are arranged to charge storage capacitor 148 to a voltage just below a threshold voltage. When the power source 12 receives vibrational energy, such as by a user deforming the power source 12 to provide vibrational energy to the energy converter 26, the energy converter 26 provides an increased charge to the storage capacitor 148 to force the voltage across storage capacitor 148 to a voltage above the aforementioned threshold voltage. The voltage comparator 146 senses the voltage across capacitor 148 increasing to above the threshold voltage and provides a control signal from its output 154 to the control input 156 of transmitter 144. In response to receiving the control signal, the transmitter 144 generates an identification code signal at output 148 which is then coupled to antenna 142 for transmitting the identification code.

As can be seen from the foregoing, the RF tag 140 provides an identification signal when the power source 12 is deformed, such as when a user presses on the power source 12, for activating the transmitter 144. Such an RF tag may be useful in applications where an interrogation signal is not required as, for example, in generating an identification signal for unlocking automobile door locks, or the like.

Figure 10:
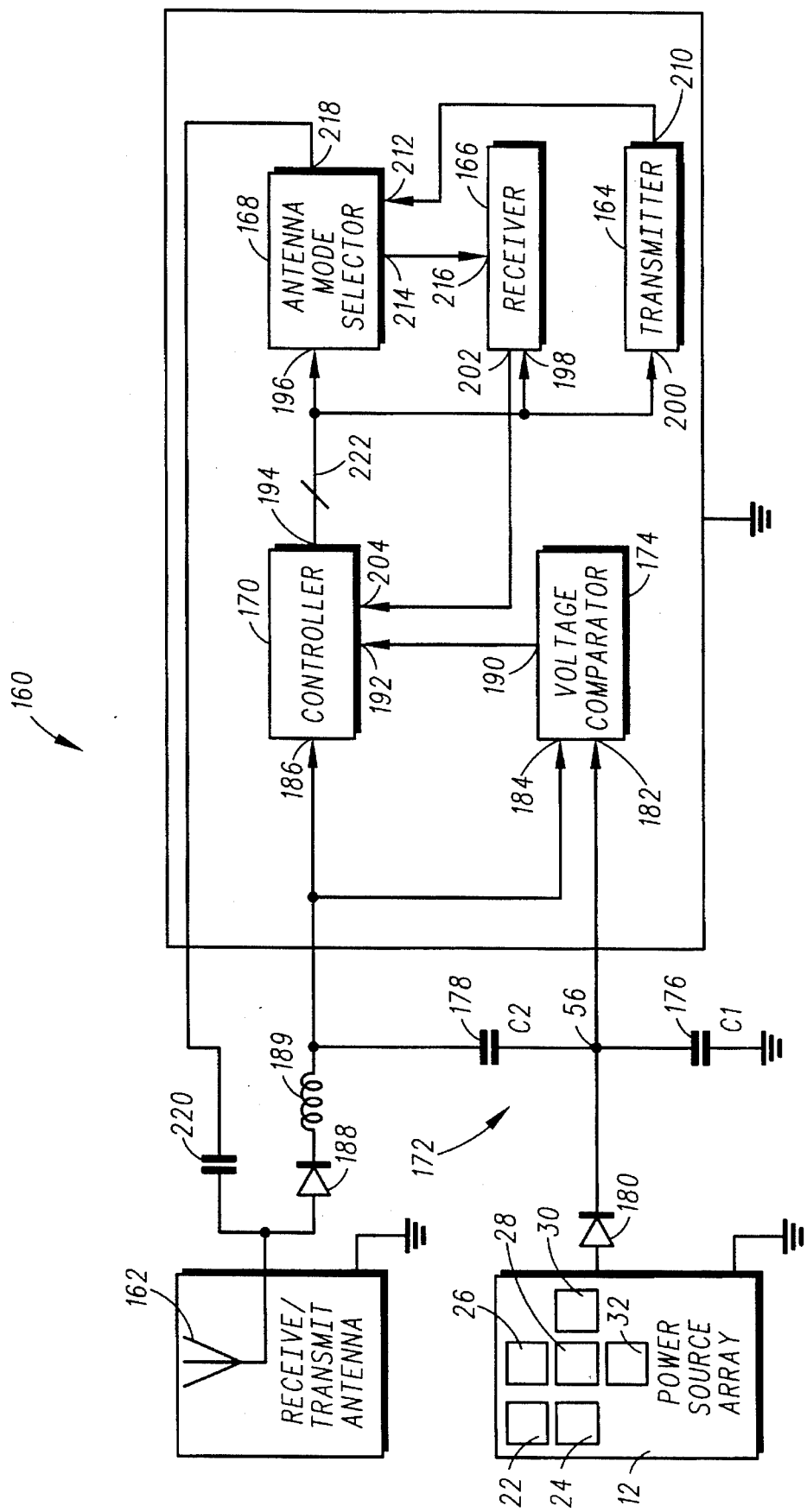
FIG. 10 is a schematic block diagram of a further RF tag embodying the present invention employing the power source of FIGS. 1 and 6 and configured for operation in a first or second preferred mode of operation.

Referring now to FIG. 10, it is a schematic block diagram of a further RF tag 160 embodying further aspects of the present invention. As will be seen hereinafter, the RF tag 160 is configured for operation in two different modalities to be described hereinafter.

The RF tag 160 generally includes a receiving and transmitting antenna 162, and the power source 12 which includes the energy converters 22, 24, 26, 28, 30, and 32. The RF tag 160 further generally includes an RF transmitter 164 for generating an identification signal, an RF receiver 166 for receiving an interrogation signal, an antenna mode selector 168 for selectively coupling the receiver 166 and transmitter 164 to the receiving and transmitting antenna 162, and a controller 170. Lastly, the RF tag 160 generally includes a storage means 172 and a voltage comparator 174.

The storage means 172 includes a first storage capacitor 176 (C1) and a second storage capacitor 178 (C2). The first and second storage capacitors 176 and 178 are coupled together at a common junction 56. The power source 112 is coupled to the junction 56 by a diode 180. The common junction 56 is in turn coupled to a first input 182 of the voltage comparator 174.

The receiving and transmitting antenna 162 is coupled to a second input 184 of voltage comparator 174, an input 186 of controller 170, and to capacitor 178 by a diode 188 and an RF choke 189. The voltage comparator 174 further includes an output 190 which is coupled to a first input 192 of controller 170. The controller 170 includes an output 194 which is coupled to an input 196 of antenna mode selector 168, an input 198 of receiver 166, and an input 200 of RF transmitter 164. The receiver 166 includes a first output 202 which is coupled to a second input 204 of controller 170.

The RF transmitter 164 includes an output 210 which is coupled to a second input 212 of the antenna mode selector 168. The antenna mode selector 168 also includes an output 214 which is coupled to a second input 216 of receiver 166. Lastly, the antenna mode selector 168 includes a second output 218 which is coupled to the receiving and transmitting antenna 162 by a capacitor 220.

As will be seen hereinafter, the voltage comparator 174 senses the voltage across the storage means 172 with respect to three different voltage thresholds $V_{T1}$, $V_{T2}$, and $V_{T3}$ wherein $V_{T1}$ is greater than $V_{T2}$ and $V_{T2}$ is greater than $V_{T3}$. The power source 12, and more specifically the energy converters 22, 24, 26, 28, 30, and 32 are arranged for charging capacitor 176 to a voltage just below the second threshold voltage ($V_{T2}$). When an interrogation signal is generated externally to the RF tag 160 by, for example, an external reader, the energy of the interrogation signal is coupled to capacitor 178 through the diode 180 to charge the storage means 172 to a voltage equal to or above the first threshold voltage ($V_{T1}$). When the voltage across the storage means 172 is equal to or exceeds the first threshold voltage ($V_{T1}$), the voltage comparator at input 184 senses this condition and provides a control signal from output 190 to the control input 192 of controller 170. In response to the control signal at input 192, the controller 170 provides a control signal from output 194 over a multiple conductor control bus 222 to the control input 198 of receiver 166 to energize the receiver 166. The controller 170 also generates a control signal which is provided to the input 196 of antenna mode selector 168 to cause the antenna mode selector 168 to couple the receiving and transmitting antenna 162 to the receiver 166 from the output 214 of antenna mode selector 168 to the input 216 of the receiver 166. The receiver 166 is now conditioned for detecting the interrogation signal.

If the interrogation signal was terminated after charging the storage means 172 to the first threshold voltage ($V_{T1}$) and after the storage means 172 discharged to a level below the second threshold voltage ($V_{T2}$), this condition is sensed by the voltage comparator 174 to cause the controller 170 to de-energize the receiver 166. However, if the receiver 166 detects the interrogation signal before the voltage across the storage means 172 decreases to the second threshold voltage, the receiver provides a control signal from output 202 to the control input 204 of controller 170 to cause the controller 170 to provide control signals over the multiple conductor control bus 222 to energize the RF transmitter 164 and to cause the antenna mode selector 168 to couple the RF transmitter 164 to the receiving and transmitting antenna 162. The RF transmitter 164 is coupled to the receiving and transmitting antenna by the antenna mode selector 168 coupling the input 212 of antenna mode selector 168 to the output 218 of antenna mode selector 168.

The RF transmitter 164 now generates an identification signal for the RF tag 160 which is conveyed to the receiving and transmitting antenna 162 for transmitting the identification signal. As previously mentioned, in connection with the device 10 of FIG. 1, the identification signal may be a modulated carrier comprising a digital code unique to the RF tag 160. The RF transmitter 164 continuously generates the identification signal until the voltage across the storage means 172 decreases to the third threshold voltage ($V_{T3}$). When this condition is sensed by the voltage comparator 174, the voltage comparator 174 provides an output from its output 190 which is received by input 192 of controller 170. Thereupon, the controller 170 generates control signals conveyed over the multiple conductor control bus 222 to de-energize the RF transmitter 164 and to place the RF tag 160 into a low power state to permit the storage means 172 to once again charge to the first voltage threshold ($V_{T1}$).

The above-described operation relates to the first mode of operation of the RF tag 160. For the second mode of operation of the RF tag 160, it is contemplated that at least one of the energy converters of the power source 12 is responsive to incident vibrational energy for providing electrical current for charging the storage capacitor 176. In accordance with this preferred embodiment, the energy converter responsive to vibrational energy is energy converter 26. The remaining energy converters 22, 24, 28, 30, and 32 are arranged for charging the storage capacitor 176 to a voltage just below the second threshold voltage ($V_{T2}$). However, when the power source 12 is vibrated or depressed to cause the energy converter 26 to charge the storage capacitor 176 to an increased voltage which may be sensed by the voltage comparator 174. This, as a result, adds a further criteria to cause the RF transmitter 164 to generate the identification signal as disclosed above in connection with the first mode of operation. More specifically, the transmitter 164 is conditioned by the controller 170 to transmit the identification signal when the voltage across the storage means 172 is above the second threshold voltage ($V_{T2}$) during the receipt of the interrogation signal by the receiver 166 and when the voltage comparator 174 senses that the power source 12 has been depressed to cause the energy converter 26 to provide additional charge to the storage capacitor 176. The further condition that the storage means 172 be first charged to a voltage above or equal to the first threshold voltage ($V_{T1}$) for energizing the RF receiver 166 also applies to this second mode of operation.

Figure 11:
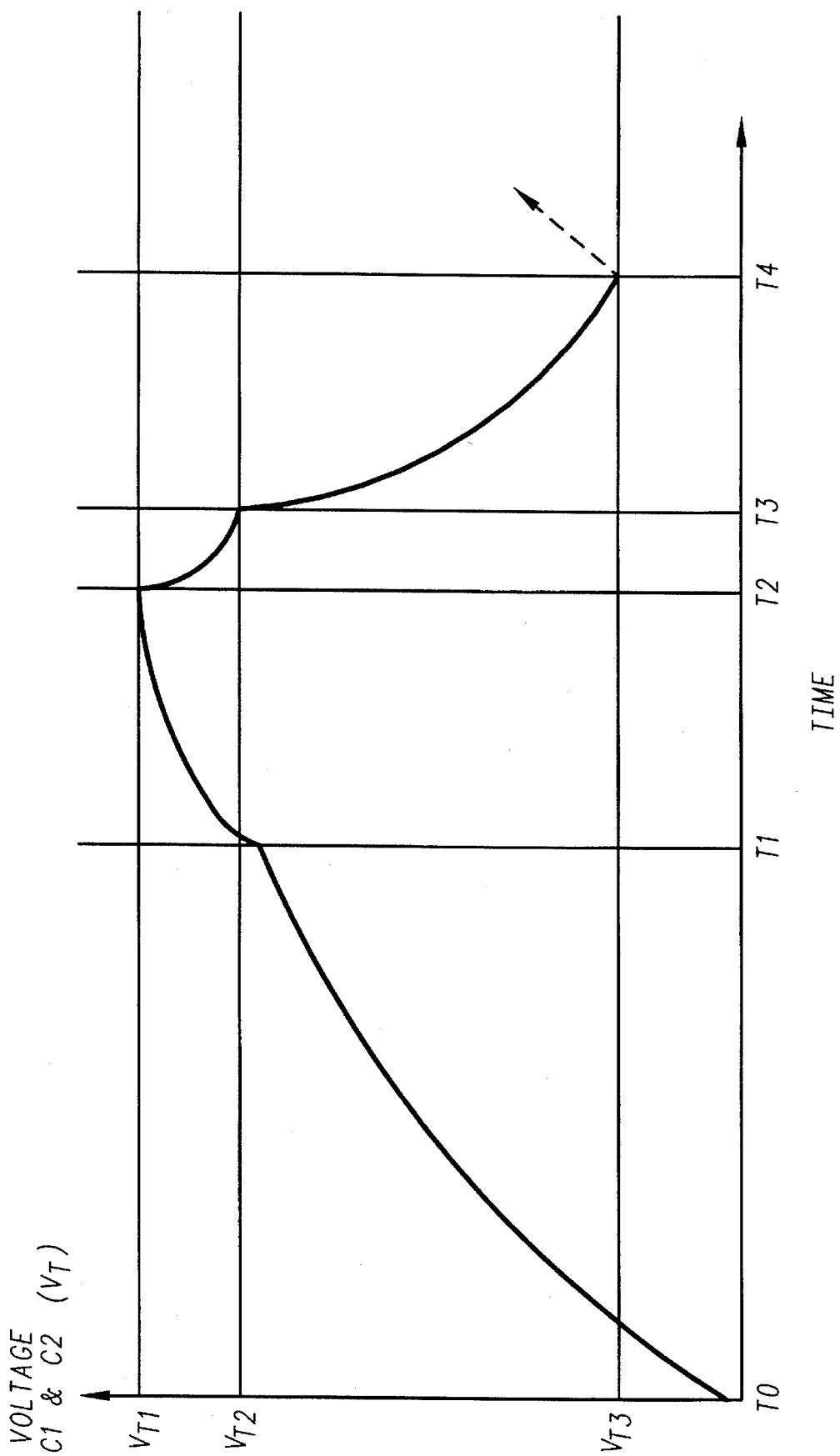
FIG. 11 is a graph of power source voltage versus time which may be referred to to lend a better understanding of the first and second preferred modes of operation of the RF tag illustrated in FIG. 10.

Referring now to FIG. 11, it is a graph of the voltage across the storage means 172 comprising the first storage capacitor 176 (C1) and the second storage capacitor 178 (C2) versus time to illustrate the operation of the RF tag 160 of FIG. 10. During the time interval from T0 to T1, the first storage capacitor 176 is charging to a voltage just below the second threshold voltage ($V_{T2}$). At time T1, the receiving and transmitting antenna 162 receives the interrogation signal which causes additional charge to be placed on the storage means 172 and, more specifically, the second storage capacitor 178. At time T2, the voltage across storage capacitors 176 and 178 reaches the first threshold voltage ($V_{T1}$). Hence, at time T2 the RF receiver 160 is energized by the controller 170 and is coupled to antenna 162 by antenna mode selector 168.

At time T3 and before the voltage across the storage means 172 decreases to below the second threshold voltage ($V_{T2}$), the receiver 166 detects the interrogation signal. As a result, at time T3 the controller 170 de-energizes the receiver 166 and energizes the transmitter 164 along with causing the antenna mode selector 168 to couple the RF transmitter 164 to the receiving and transmitting antenna 162. The RF transmitter 164 continues to transmit the identification signal until the voltage across the storage means 172 decreases to the third threshold voltage ($V_{T3}$) at time T4. At time T4, the controller 170 de-energizes the transmitter 164 and places the RF tag 160 into a low power state to permit the storage means 172 to once again permit the first storage capacitor 176 to charge to the second threshold voltage ($V_{T2}$).

Figure 12:
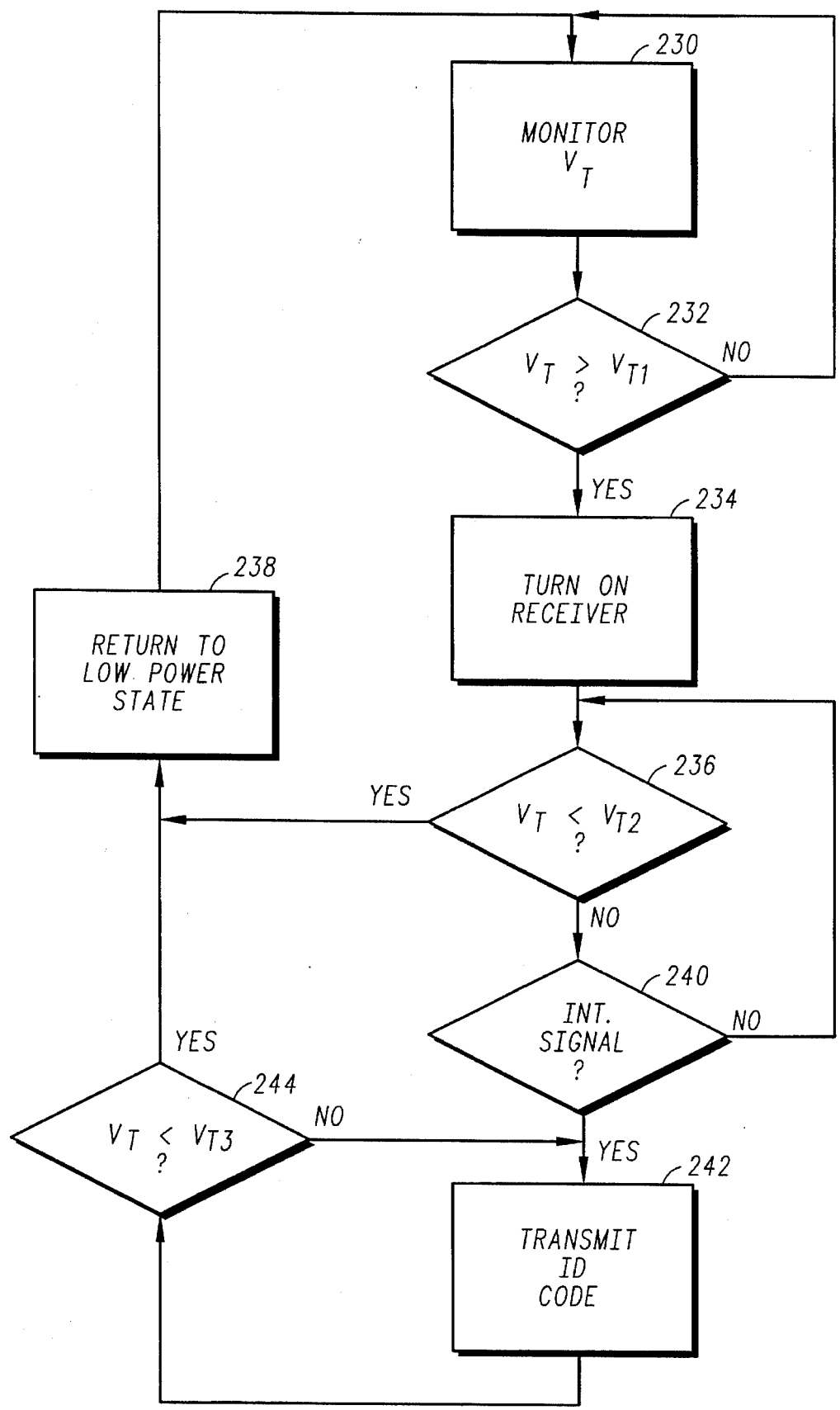
FIG. 12 is a flow diagram illustrating the manner in which the RF tag of FIG. 10 may be implemented in accordance with the first preferred mode of operation.

Referring now to FIG. 12, it is a flow diagram illustrating the manner in which the controller 170 may be implemented to control the operation of the RF tag 160 in accordance with the first mode of operation of the RF tag 160. The process begins at step 230 wherein the voltage comparator 174 monitors the voltage ($V_T$) across the storage means 172. In step 232, the controller interrogates the voltage comparator 174 to determine if the voltage across the storage means 172 is equal to or above the first threshold voltage ($V_{T1}$). If the voltage across the storage means 172 is not equal to or greater than the first threshold voltage, the controller returns to step 230. However, if the voltage across the storage means 172 is above the first threshold voltage, the controller then in step 234 energizes the RF receiver 166 and causes the antenna mode selector 168 to couple receiver 166 to antenna 162.

After step 236, the controller interrogates the voltage comparator 174 to determine if the voltage across the storage means 172 has decreased to a voltage below the second threshold voltage ($V_{T2}$). If it has, the controller then de-energizes the receiver 166 to return the RF tag 160 to the low power state in step 238. This permits the storage means 172 to once again be charged to the first threshold voltage by the receipt of the interrogation signal. However, if the voltage across the storage means 172 is above the second threshold voltage, the controller then proceeds to step 240 to determine if the receiver 166 has received the interrogation signal. If the receiver has not received the interrogation signal, the controller then returns to step 236 to once again interrogate the voltage comparator 174 to determine if the voltage across the storage means 172 has decreased to below the second voltage threshold. If in step 240 the controller 170 determines that the receiver 166 has received the interrogation signal, the controller then in step 242 causes the antenna mode selector 166 to couple the receiving and transmitting antenna 162 to the RF transmitter 164 and causes the RF transmitter 164 to transmit the identification code.

As the transmitter 164 is transmitting the identification code, the controller 170 interrogates the voltage comparator 174 to determine if the voltage across the storage means 172 has decreased to below the third threshold voltage in step 244. If the voltage across the storage means 172 has decreased to below the third threshold voltage, the controller then proceeds to step 238 to return the RF tag 160 to the low power state for the recharging of the storage means. However, if the voltage across the storage means 172 has not decreased to below the third threshold voltage, the controller then permits the RF transmitter 164 to continue transmitting the identification code. The controller permits the transmitter 164 to continue transmitting the identification code until the voltage across the storage means 172 has decreased to below the third threshold voltage.

Figure 13:
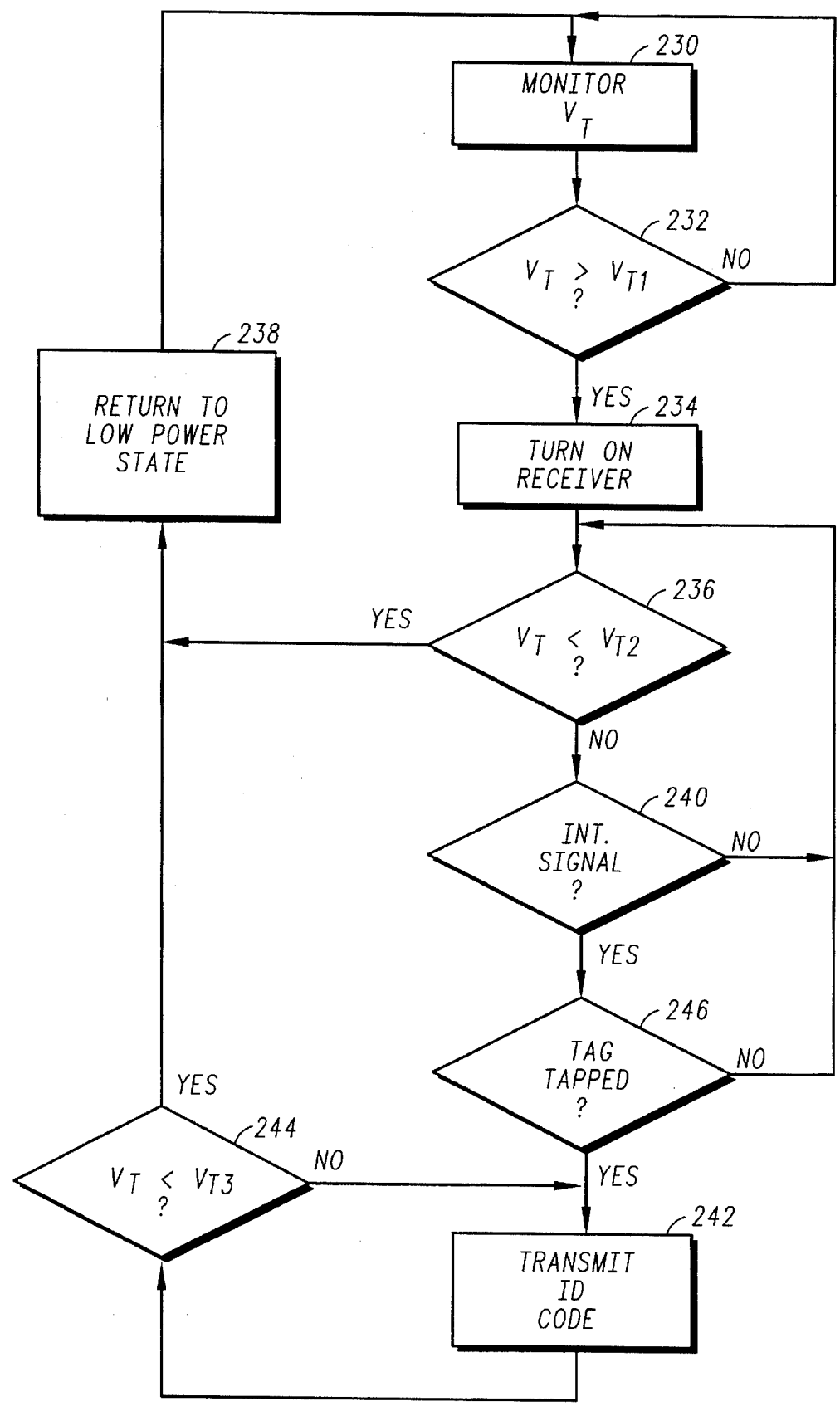
FIG. 13 is a flow diagram illustrating the manner in which the RF tag of FIG. 10 may be implemented in accordance with the second preferred mode of operation.

Referring now to FIG. 13, it is a flow diagram illustrating the manner in which the controller 170 may be implemented for controlling the RF tag 160 in accordance with the second mode of operation. It will be noted that in FIG. 13 that the controller process, in accordance with this preferred embodiment, includes the same process steps 230, 232, 234, 236, 238, 240, 242, and 244 as previously described in connection with the embodiment of FIG. 12. The process of FIG. 13 however includes a further step 246 wherein the controller 170 determines from the voltage comparator 174 if the RF tag 160, and more particularly, the power source 12, has been tapped or otherwise deformed so as to cause the energy converter 26 to provide additional electrical charge to the storage capacitor 176 to indicate that the operator has tapped or depressed the RF tag 160. If in step 246 the controller determines that the operator has not tapped the RF tag 160, the controller returns to step 236 to once again determine from the voltage comparator 174 if the voltage across the storage means 172 has decreased to below the second threshold voltage ($V_{T2}$). However, if in step 246 the controller 170 determines that the RF tag has been tapped with the other conditions for transmission being met, namely, the voltage across the storage means 172 being above the second threshold voltage and the receiver 166 having received the interrogation signal in step 240, the controller 170 in step 242 causes the antenna mode selector 168 to couple the RF transmitter 164 to the receiving and transmitting antenna 162 and to cause the RF transmitter 164 to transmit the identification code. Again, the RF transmitter 164 will continue to transmit the identification code until the controller, in step 244, determines that the voltage across the storage means 172 has decreased to below the third threshold voltage $V_{T3}$.

While particular embodiments of the present invention have been shown and described, modifications may be made, and it is therefore intended in the appended claims, to cover all such changes and modifications which fall within the true spirit and scope of the invention.

We claim:

1. An RF tag comprising:

an RF transmitter for transmitting an identification signal; and a power source for powering said RF transmitter, said power source including a plurality of energy converters, each said energy converter being responsive to a predetermined form of incident energy for converting its respective predetermined form of incident energy to electrical current, at least two of said energy converters being responsive to respective different predetermined forms of incident energy for providing electrical current and storage means for storing the electrical current provided by said energy converters and being coupled to said RF transmitter, wherein said RF transmitter includes an output for providing said identification signal and wherein said output is coupled to said energy converters wherein said energy converters form an antenna for said RF transmitter.

2. An RF tag as defined in claim 1 further including an RF receiver for receiving an interrogation signal, wherein said storage means is coupled to said RF receiver for powering said RF receiver, and wherein said RF transmitter transmits said identification signal responsive to said RF receiver receiving said interrogation signal.

3. An RF tag as defined in claim 1 wherein said identification signal comprises a predetermined identifying code.

4. An RF tag as defined in claim 1 wherein said output is capacitively coupled to said energy converters.

5. An RF tag as defined in claim 1 wherein said power source includes interconnect means for interconnecting said energy converters and wherein said output is coupled to said interconnect means.

6. An RF tag as defined in claim 5 wherein said output is capacitively coupled to said interconnect means.

7. An RF tag comprising:

an RF transmitter for transmitting an identification signal; and a power source for powering said RF transmitter, said power source including a plurality of energy converters, each said energy converter being responsive to a predetermined form of incident energy for converting its respective predetermined form of incident energy to electrical current, at least two of said energy converters being responsive to respective different predetermined forms of incident energy for providing electrical current and storage means for storing the electrical current provided by said energy converters and being coupled to said RF transmitter, wherein at least one of said energy converters is responsive to incident vibrational energy for providing electrical current, and wherein said one of said energy converters responsive to incident vibrational energy comprises flexible piezoelectric material which provides energy output when the material is deformed (flexed) by a user of the power source.

8. An RF tag as defined in claim 7 further including an RF receiver for receiving an interrogation signal and voltage sensing means coupled to said storage means and responsive to the voltage on said storage means exceeding a first threshold voltage for energizing said RF receiver.

9. An RF tag as defined in claim 8 wherein said voltage sensing means further de-energizes said RF receiver when the voltage on said storage means decreases to or below a second voltage threshold in the absence of a received interrogation signal.

10. An RF tag as defined in claim 9 wherein said RF transmitter is responsive to said voltage sensing means sensing a voltage on said storage means above said second threshold voltage and sensing said energy converter responsive to incident vibrational energy receiving incident vibrational energy, and to said RF receiver receiving said interrogation signal for transmitting said identification signal.

11. An RF tag as defined in claim 10 wherein said RF transmitter is further responsive to said voltage sensing means for transmitting said identification signal until said voltage sensing means senses a decreased voltage on said storage means below a third threshold voltage.

12. An RF tag as defined in claim 11 wherein said voltage sensing means re-energizes said RF receiver when the voltage on said storage means returns to or is above said first threshold voltage.

13. An RF tag as defined in claim 12 further including a single antenna for transmitting said identification signal and for receiving said interrogation signal and switch means for selectively coupling said antenna to said RF transmitter and said RF receiver responsive to said voltage sensing means.

14. An RF tag as defined in claim 1 wherein at least one of said energy converters is responsive to incident infrared energy for providing electrical current.

15. An RF tag as defined in claim 1 wherein at least one of said energy converters is responsive to incident heat energy for providing electrical current.

16. An RF tag as defined in claim 1 wherein at least one of said energy converters is responsive to incident visible light for providing electrical current.

17. An RF tag as defined in claim 1 wherein at least one of said incident energy converters is responsive to radio frequency energy for providing electrical current.

18. An RF tag source as defined in claim 17 wherein said radio frequency energy is radio frequency energy in the frequency spectrum below one gigahertz.

19. An RF tag as defined in claim 17 wherein said radio frequency energy is radio frequency in the frequency spectrum above one gigahertz.

20. An RF tag as defined in claim 1 wherein at least one of said energy converters is responsive to incident vibrational energy for providing electrical current and wherein at least another one of said energy converters is responsive to incident radio frequency energy for providing electrical current.

21. An RF tag as defined in claim 1 wherein at least one of said energy converters is responsive to incident radio frequency energy for providing electrical current and wherein at least another one of said energy converters is responsive to incident visible light for providing electrical energy.

22. An RF tag comprising:

an RF transmitter for transmitting an identification signal; and a power source for powering said RF transmitter, said power source including a plurality of energy converters, each said energy converter being responsive to a predetermined form of incident energy for converting its respective predetermined form of incident energy to electrical current, at least two of said energy converters being responsive to respective different predetermined forms of incident energy for providing electrical current and storage means for storing the electrical current provided by said energy converters and being coupled to said RF transmitter, and an RF receiver for receiving an interrogation signal, wherein said storage means is coupled to said RF receiver for powering said RF receiver, and wherein said RF transmitter transmits said identification signal responsive to said RF receiver receiving said interrogation signal, wherein said RF transmitter includes an output for providing said identification signal, wherein said RF receiver includes an input for receiving said interrogation signal, and wherein said input and said output are coupled to said energy converters wherein said energy converters form an antenna for said RF receiver and said RF transmitter.

23. An RF tag as defined in claim 22 wherein said input and said output are capacitively coupled to said energy converters.

24. An RF tag as defined in claim 22 wherein said power source includes interconnect means for interconnecting said energy converters and wherein said input and said output are coupled to said interconnect means.

25. An RF tag as defined in claim 24 wherein said input and said output are capacitively coupled to said interconnect means.

26. An RF tag as defined in claim 25 wherein said RF transmitter transmits on a first frequency, wherein said receiver receives on a second frequency, said first frequency being different than said second frequency, wherein said RF tag further includes first coupling means for coupling said RF receiver input to said interconnect means, second coupling means for coupling said RF transmitter to said interconnect means, and wherein one of said first and second coupling means includes tuning means for tuning said energy converters to an RF frequency substantially corresponding to either said first frequency or said second frequency.

27. An RF tag as defined in claim 26 wherein said tuning means comprises inductance means for inductively tuning said RF frequency of said energy converters.

28. An RF tag comprising:

an RF transmitter for transmitting an identification signal; and a power source for powering said RF transmitter, said power source including a plurality of energy converters, each said energy converter being responsive to a predetermined form of incident energy for converting its respective predetermined form of incident energy to electrical current, at least two of said energy converters being responsive to respective different predetermined forms of incident energy for providing electrical current and storage means for storing the electrical current provided by sale energy converters and being coupled to said RF transmitter, and an RF receiver for receiving an interrogation signal, wherein said storage means is coupled to said RF receiver for powering said RF receiver, and wherein said RF transmitter transmits said identification signal responsive to said RF receiver receiving said interrogation signal, wherein said RF receiver includes an input for receiving said interrogation signal and wherein said input is coupled to said energy converters wherein said energy converters form an antenna for said RF receiver.

29. An RF tag as defined in claim 28 wherein said input is capacitively coupled to said energy converters.

30. An RF tag as defined in claim 28 wherein said power source includes interconnect means for interconnecting said energy converters and wherein said input is coupled to said interconnect means.

31. An RF tag as defined in claim 30 wherein said input is capacitively coupled to said interconnect means.

32. A power source for generating and storing electrical energy for providing said electrical energy to a portable electronic device, said power source comprising:

a plurality of energy converters, each said energy converter being responsive to a predetermined form of incident energy for converting its respective predetermined form of incident energy to electrical current, at least two of said energy converters being responsive to respective different predetermined forms of incident energy for providing electrical current; and storage means for storing the electrical current provided by said energy converters;

wherein each of said energy converters is substantially planar in configuration and arranged one on top of another in parallel plane arrangement.

33. A power source according to claim 32 wherein one of said energy converters is responsive to incident vibrational energy for providing electrical current.

34. A power source according to claim 32 wherein one of said energy converters is responsive to visible light for providing electrical current, and wherein electrical conductors for at least another of said energy converters are transparent.

35. An RF tag comprising:

an RF transmitter for transmitting an identification signal;

a power source for powering said RF transmitter, said power source generating and storing electrical energy for powering said RF transmitter, said power source comprising:

a plurality of energy converters, each said energy converter being responsive to a predetermined form of incident energy for converting its respective predetermined form of incident energy to electrical current, at least two of said energy converters being responsive to respective different predetermined forms of incident energy for providing electrical current; and storage means for storing the electrical current provided by said energy converters;

wherein each of said energy converters is substantially planer in configuration and arranged one on top of another in parallel plane arrangement.

36. An RF ID tag according to claim 35 wherein one of said energy converters is responsive to incident vibrational energy for providing electrical current.

37. An RF ID tag according to claim 35 wherein one of said energy converters is responsive to visible light for providing electrical current, and wherein electrical conductors for at least another of said energy converters are transparent.

38. An RF tag comprising:

an RF transmitter for transmitting an identification signal; and a power source for powering said RF transmitter, said power source including a plurality of energy converters, each said energy converter being responsive to a predetermined form of incident energy for converting its respective predetermined form of incident energy to electrical current, at least two of said energy converters being responsive to respective different predetermined forms of incident energy for providing electrical current and storage means for storing the electrical current provided by said energy converters and being coupled to said RF transmitter, and further including antenna means for receiving an interrogation signal and coupled to said storage means, wherein said power source provides electrical current to said storage means for charging said storage means to a voltage below a threshold voltage, and wherein said RF transmitter is responsive to said interrogation signal received by said antenna means forcing the voltage on said storage means above said threshold voltage for transmitting said identification signal.

39. An RF tag as defined in claim 38 wherein said storage means comprises a first storage means for storing a first voltage derived from said power source and a second storage means for storing a second voltage derived from said interrogation signal, wherein said first voltage is below said threshold voltage and wherein the sum of said first and second voltages is above said threshold voltage.

40. An RF tag comprising:

an RF transmitter for transmitting an identification signal; and a power source for powering said RF transmitter, said power source including a plurality of energy converters, each said energy converter being responsive to a predetermined form of incident energy for converting its respective predetermined form of incident energy to electrical current, at least two of said energy converters being responsive to respective different predetermined forms of incident energy for providing electrical current and storage means for storing the electrical current provided by said energy converters and being coupled to said RF transmitter, wherein one of said energy converters is responsive to incipient vibrational energy for providing electrical current, and wherein said power source provides electrical current to said storage means when at rest for charging said storage means to a voltage below a threshold voltage, said energy converter responsive to incident vibrational energy responsive to receiving vibrational energy for charging said storage means to a voltage above said threshold voltage, and wherein said transmitting means is responsive to said storage means charging to a voltage above said threshold voltage for transmitting said identification signal.

* * * * *

UNITED STATES PATENT AND TRADEMARK OFFICE
CERTIFICATE OF CORRECTION

PATENT NO. : 5,457,447
DATED : 10/10/95
INVENTOR(S) : Ghaem et al.

It is certified that error appears in the above-indentified patent and that said Letters Patent is hereby corrected as shown below:

In claim 7, col. 14, lines 12 through 26, please cancel the wording, "comprising: an RF transmitter . . . and being coupled to said RF transmitter,", and insert --as defined in claim 1--.

In claim 28, col. 16, line 26, delete "sale" and insert --said--.

In claim 38, col. 18, line 6, insert --,-- after "signal", in line 7 insert --,-- after "means", and in line 8 delete "for" and insert --which results in--.

In claim 40, col. 18, line 31, delete "incipient" and insert --incident--.

Signed and Sealed this

Twenty-fifth Day of November, 1997

BRUCE LEHMAN

Attest:

Attesting Officer

Commissioner of Patents and Trademarks